(12) United States Patent
Nielsen et al.

(10) Patent No.: US 12,331,712 B2
(45) Date of Patent: Jun. 17, 2025

(54) WIND TURBINE

(71) Applicant: VESTAS WIND SYSTEMS A/S, Aarhus (DK)

(72) Inventors: Thomas S. Bjertrup Nielsen, Randers (DK); Robert Thomas Rudolf, Aarhus (DK); Torben Juul Larsen, Roskilde (DK); Mikkel Kiilerich Østerlund, Aarhus (DK)

(73) Assignee: VESTAS WIND SYSTEMS A/S, Aarhus (DK)

( * ) Notice: Subject to any disclaimer, the term of this patent is extended or adjusted under 35 U.S.C. 154(b) by 0 days.

(21) Appl. No.: 18/723,623

(22) PCT Filed: Dec. 9, 2022

(86) PCT No.: PCT/DK2022/050274
§ 371 (c)(1),
(2) Date: Jun. 24, 2024

(87) PCT Pub. No.: WO2023/126041
PCT Pub. Date: Jul. 6, 2023

(65) Prior Publication Data
US 2025/0052225 A1 Feb. 13, 2025

(30) Foreign Application Priority Data
Dec. 28, 2021 (DK) .............................. PA202170673

(51) Int. Cl.
*F03D 1/06* (2006.01)
(52) U.S. Cl.
CPC ......... *F03D 1/0658* (2013.01); *F03D 1/0675* (2013.01); *F05B 2240/917* (2013.01)
(58) Field of Classification Search
CPC ..... F03D 1/0625; F03D 1/0658; F03D 1/0675
See application file for complete search history.

(56) References Cited

U.S. PATENT DOCUMENTS

| 4,403,916 A | 9/1983 | Skelskey |
| 8,629,570 B1 | 1/2014 | Kamenov |

(Continued)

FOREIGN PATENT DOCUMENTS

| CN | 103174583 A | 6/2013 |
| CN | 106917719 B | 3/2021 |

(Continued)

OTHER PUBLICATIONS

Danish Patent and Trademark Office, 1st Technical Examination including the Search Report for Application PA 2021 70673 dated Jun. 14, 2022.

(Continued)

*Primary Examiner* — Brian O Peters
(74) *Attorney, Agent, or Firm* — Patterson + Sheridan, LLP (57) ABSTRACT

A wind turbine comprising includes a tower, a nacelle mounted on the tower, and a rotor mounted to the nacelle. The rotor comprises a hub and at least three pitchable wind turbine blades connected to the hub via respective pitch mechanisms. The airfoil profile of each blade has a thickness being the greatest distance between the windward and leeward sides orthogonal to the chord. Each blade comprises a connection point located at a first radial position between the blade root and the blade tip. The wind turbine further comprises one or more blade connecting members connected between the connection point and a corresponding connection point on a neighbouring blade. The thickness and/or the relative thickness of each blade is substantially constant or has a local minimum within an inboard portion of the blade between the blade root and the connection point.

20 Claims, 9 Drawing Sheets

(56) References Cited

U.S. PATENT DOCUMENTS

| | | | |
|---|---|---|---|
| 2009/0208337 A1* | 8/2009 | Chambers | F03D 3/062 |
| | | | 416/210 R |
| 2010/0086407 A1 | 4/2010 | Holmoy | |
| 2011/0309625 A1 | 12/2011 | Dehlsen et al. | |
| 2012/0051914 A1 | 3/2012 | Dehlsen et al. | |
| 2016/0138563 A1* | 5/2016 | Altmikus | F03D 1/0675 |
| | | | 416/223 A |
| 2021/0207582 A1 | 7/2021 | Nielsen et al. | |
| 2021/0215130 A1 | 7/2021 | Nielsen et al. | |
| 2021/0222668 A1 | 7/2021 | Lipka et al. | |

FOREIGN PATENT DOCUMENTS

| | | |
|---|---|---|
| DE | 102019119027 A1 | 1/2021 |
| EP | 2142795 A2 | 1/2010 |

OTHER PUBLICATIONS

PCT International Search Report and Written Opinion of the International Searching Authority for Application PCT/DK2022/050274 dated Apr. 18, 2023 (Apr. 18, 2023).

\* cited by examiner

WIND TURBINE

TECHNICAL FIELD

The present invention relates generally to wind turbines and more particularly to a wind turbine having a rotor comprising at least three pitchable rotor blades and one or more blade connecting members connecting neighbouring blades.

BACKGROUND

There is a continuing desire to generate increased levels of power from onshore and offshore wind farms. One way to achieve this is to provide modern wind turbines with larger wind turbine blades. The provision of larger blades increases the swept area of the rotor, allowing the wind turbine to capture more energy from the wind. However, wind turbine blades experience various loads and stresses in use, and increasing the length of a wind turbine blade increases the magnitude of loads that the blade must withstand. For example, flapwise loads resulting from wind pressure on the blade, and edgewise loads resulting from the weight of the blade, are both greater for larger blades.

An inboard end of a wind turbine blade comprises a blade root at which the blade is attached to a hub of the wind turbine. To withstand the increased loading in use, large blades are typically manufactured using more material near the inboard end, and/or by increasing the diameter of the blade root, and/or by increasing the thickness of the blade near the inboard end. Each of these solutions increases the rigidity and strength of the inboard end of the blade such that it can support increased loading. However, in practice, each of these solutions also has drawbacks and limitations.

For example, increasing the root diameter can make it more difficult to manufacture and transport the blade, using more material near the inboard end increases the weight and cost of the blade, and increasing the thickness of the blade near the inboard end is detrimental to the aerodynamic performance of the blade. By way of example, airfoil profiles with increased thickness and relative thickness (i.e. thickness to chord ratio) typically have a poor lift-to-drag ratio, and a relatively low glide ratio at the operational angles of attack which makes such portions of the blade more sensitive to surface roughness. Portions of the blade having a high thickness for increased structural performance therefore typically capture less energy from the wind and cause increased drag, which adversely affects the total power that a wind turbine can produce.

It is against this background that the present invention has been devised.

SUMMARY

In a first aspect of the present invention there is provided a wind turbine comprising a tower, a nacelle mounted on the tower, and a rotor mounted to the nacelle. The rotor comprises a hub and at least three pitchable wind turbine blades connected to the hub via respective pitch mechanisms. Each blade extends from a blade root defining a radial position $r=0$ to a blade tip defining a radial position $r=R$. Each blade comprises a windward side and a leeward side which meet at a leading edge and a trailing edge to define an airfoil profile. A chord is the distance between the leading and trailing edges, and a relative thickness is the ratio of thickness to chord. The airfoil profile has a thickness being the greatest distance between the windward and leeward sides orthogonal to the chord. Each blade comprises a connection point located at a first radial position ($r1$) between the blade root and the blade tip. The wind turbine further comprises one or more blade connecting members connected between the connection point and a corresponding connection point on a neighbouring blade. The thickness and/or the relative thickness of each blade is substantially constant or has a local minimum within an inboard portion of the blade between the blade root and the connection point.

A substantially constant thickness and/or relative thickness means that the thickness and/or relative thickness of the blade does not vary by more than 1% over a portion of the blade at least 0.05R in length.

The inboard portion of each blade preferably extends over a length of at least 0.05R. More preferably, the inboard portion may extend over a length of at least 0.1R. More preferably still, the inboard portion may extend over a length of at least 0.15R. The inboard portion preferably extends over a length of at most 0.35R. More preferably, the inboard portion may extend over a length of at most 0.2R. An inboard portion having a length within these preferable ranges advantageously provides an aerodynamic benefit without adversely affecting the structural performance of the blade.

In some examples, the wind turbine may comprise a plurality of blade connecting members connected between the connection point and a corresponding connection point on a neighbouring blade. As such, a proportion of the loads experienced by the blade in use may be transferred to a plurality of blade connecting members, thereby reducing the load in each member.

In the present context the term 'blade connecting member' should be interpreted broadly to cover any suitable kind of tension member, inclusive of flexible and rigid members. As such, in some examples the blade connecting member may comprise a cable. Preferably the blade connecting member may therefore be a blade connecting cable, and the rotor may be a cable-stayed rotor. For example, in the present context, a 'cable' may be a braided or laid rope of metal wires (such as for example steel wires), polymer fibres (such as for example polyethylene, polypropylene, nylon, polyester, aramid fibres), inorganic fibres (such as for example carbon fibres) or hybrid ropes of such materials. In some other examples, the blade connecting member may comprise composite members such as a pultrusion, or a metal rod to name a few possible examples.

The inboard portion may extend in a radial interval of between $r=0.2R$ and $r=0.55R$. Preferably, the inboard portion may extend in a radial interval of between $r=0.3R$ and $r=0.50R$. More preferably the inboard portion may extend in a radial interval of between $r=0.35R$ and $r=0.45R$. Configuring a blade with an inboard portion located in these radial intervals provides improved aerodynamic performance in such a radial interval compared to typical blades.

In some examples, the relative thickness may be between 0.15 and 0.50 throughout the inboard portion of each blade. Preferably the relative thickness may be between 0.18 and 0.4 throughout the inboard portion of each blade. More preferably, the relative thickness may be between 0.20 and 0.36 throughout the inboard portion of each blade. A relative thickness within these preferable ranges provides an advantageous compromise between blade strength and aerodynamic performance.

The thickness of each blade preferably decreases moving from the blade root to the inboard portion. The thickness of each blade may decrease monotonically moving from the blade root to the inboard portion. Preferably, the thickness of each blade may decrease strictly monotonically moving from the blade root to the inboard portion. Strictly monotonically decreasing means that the thickness of the blade decreases constantly moving from the blade root to the inboard portion. As such, the thickness of the blade may be greatest at the blade root. Accordingly, the blade root may be configured for structural performance, and moving outboard from the blade root, the blade may become more aerodynamically optimised.

The relative thickness of each blade may decrease moving from the blade root to the inboard portion. The relative thickness of each blade may decrease monotonically moving from the blade root to the inboard portion. Preferably, the relative thickness of each blade may decrease strictly monotonically moving from the blade root to the inboard portion. Strictly monotonically decreasing means that the relative thickness of the blade decreases constantly moving from the blade root to the inboard portion. As such, the relative thickness of the blade may be greatest at the blade root. Accordingly, the blade root may be configured for structural performance, and moving outboard from the blade root to the inboard portion, the blade may become more aerodynamically optimised.

In some examples, the thickness of each blade may increase moving from the inboard portion to the connection point. Additionally or alternatively, the relative thickness of each blade may increase moving from the inboard portion to the connection point. For example, the thickness of the blade may increase to provide a strong portion of the blade for connecting the blade connecting member. Such an increase in thickness may similarly cause an increase in relative thickness moving from the inboard portion to the connection point.

In some examples, the local minimum may be located in a radial interval of between 0.02R and 0.25R inboard from the connection point. Preferably the local minimum may be located in a radial interval of between 0.05R and 0.15R inboard from the connection point. More preferably, the local minimum may be located in a radial interval of between 0.05R and 0.1R inboard from the connection point. As such, the local minimum is preferably located as far outboard as possible to provide the greatest aerodynamic benefit because the swept area increases with radial distance from r=0, but is still spaced apart from the connection point such that the blade is sufficiently strong at, or in the vicinity of, the connection point.

The connection point of each blade may be located in a radial interval between r=0.20R and r=0.6R. Preferably, the connection point of each blade may be located in a radial interval between r=0.3R and r=0.55R. More preferably, the connection point of each blade may be located in a radial interval between r=0.35R and r=0.50R. Locating the connection point within these ranges help to transfer an advantageous proportion of the loads from the blade to hub via a blade connecting member.

The relative thickness of each blade at the connection point may be between 0.15 and 0.5. Preferably the relative thickness of each blade at the connection point may be between 0.20 and 0.40. More preferably the relative thickness of each blade at the connection point may be between 0.24 and 0.36. A relative thickness in these preferably ranges may provide a strong portion of the blade for connecting the blade connecting member without substantial detriment to the aerodynamic performance of the blade.

The thickness and/or the relative thickness of the blade may have a local maximum in the vicinity of the connection point. As such, the blade may be thicker/have a greater relative thickness in the vicinity of the connection point to increase the strength of the blade in the vicinity of the connection point. For example, the local maximum may be within 0.2R from the connection point. Preferably, the local maximum may be within 0.1R from the connection point. More preferably, the local maximum may be within 0.05R from the connection point, including at the connection point in some examples.

In some examples, the thickness and/or chord and/or twist of the blade may be substantially constant at or near the connection point. For example, the connection point may be located within a radial interval between 0.01R and 0.2R in length, preferably between 0.01R and 0.1R in length, and more preferably between 0.01R and 0.05R in length, for example between 0.03R and 0.05R in length, in which the thickness and/or chord and/or twist of the blade may be substantially constant. For example, the connection point may be located at or near to a joint between two blade modules of a modular blade. Typically, blades change twist continuously along their length. However, in some examples it may be advantageous that close to the connection point the twist is kept constant. The blade modules may have substantially the same profile, i.e. same outer geometry, at the joint to facilitate connecting the blade modules together in a more beneficial manner. Accordingly, the thickness and/or chord of the blade may be substantially constant at or near the connection point.

The thickness of each blade may decrease monotonically moving from the connection point to the blade tip. Preferably, the thickness of each blade may decrease strictly monotonically moving from the connection point to the blade tip. Additionally or alternatively, the relative thickness of each blade may decrease monotonically moving from the connection point to the blade tip. Preferably, the relative thickness of each blade may decrease strictly monotonically moving from the connection point to the blade tip. As such, the blade outboard of the connection point is preferably configured primarily for aerodynamic performance over structural requirement. In particular, the thinner airfoil profiles outboard of the connection point are less sensitive to surface roughness, capture more energy from the wind, and thereby generate more lift to increase the power produced by the wind turbine.

The relative thickness of each blade may be less than 0.5, preferably less than 0.4, more preferably less than 0.36, for at least 60% of the total blade length, preferably at least 65% of the total blade length, more preferably at least 75% of the total blade length.

The relative thickness of each blade may be less than 0.5, preferably less than 0.4, more preferably less than 0.36, for a length of at least 0.05R between the blade root and the connection point, preferably for a length of at least 0.1R between the blade root and the connection point, and more preferably for a length of at least 0.2R between the blade root and the connection point.

The wind turbine may further comprise one or more aero devices, such as a vortex generator and/or gurney flap and/or stall barrier, arranged between the blade root and the inboard portion. In some examples, the wind turbine may additionally or alternatively comprise one or more aero devices, such as a vortex generator and/or gurney flap and/or stall barrier, arranged in the vicinity of the connection point. The or each aero device may help to improve the aerodynamic performance and lift generation of thicker portions of the wind turbine blade, such as inboard of the inboard portion and/or in the vicinity of the connection point.

In some examples, each blade may have total blade length R of at least 70 m. Preferably, each blade may have total blade length R of at least 80 m. More preferably each blade may have total blade length R of at least 85 m. The provision of a blade connecting member connected to a connection point on the blade facilitates the use of longer blades that can capture more energy from the wind without the drawbacks related to structural requirements at or near the blade root. Practically speaking this may in many cases allow for longer blades at similar same weight and/or lighter blades at similar length as prior art blades.

BRIEF DESCRIPTION OF THE DRAWINGS

Examples of the present invention will now be described by way of non-limiting example only, with reference to the accompanying figures, in which.

DETAILED DESCRIPTION

Figure 1:
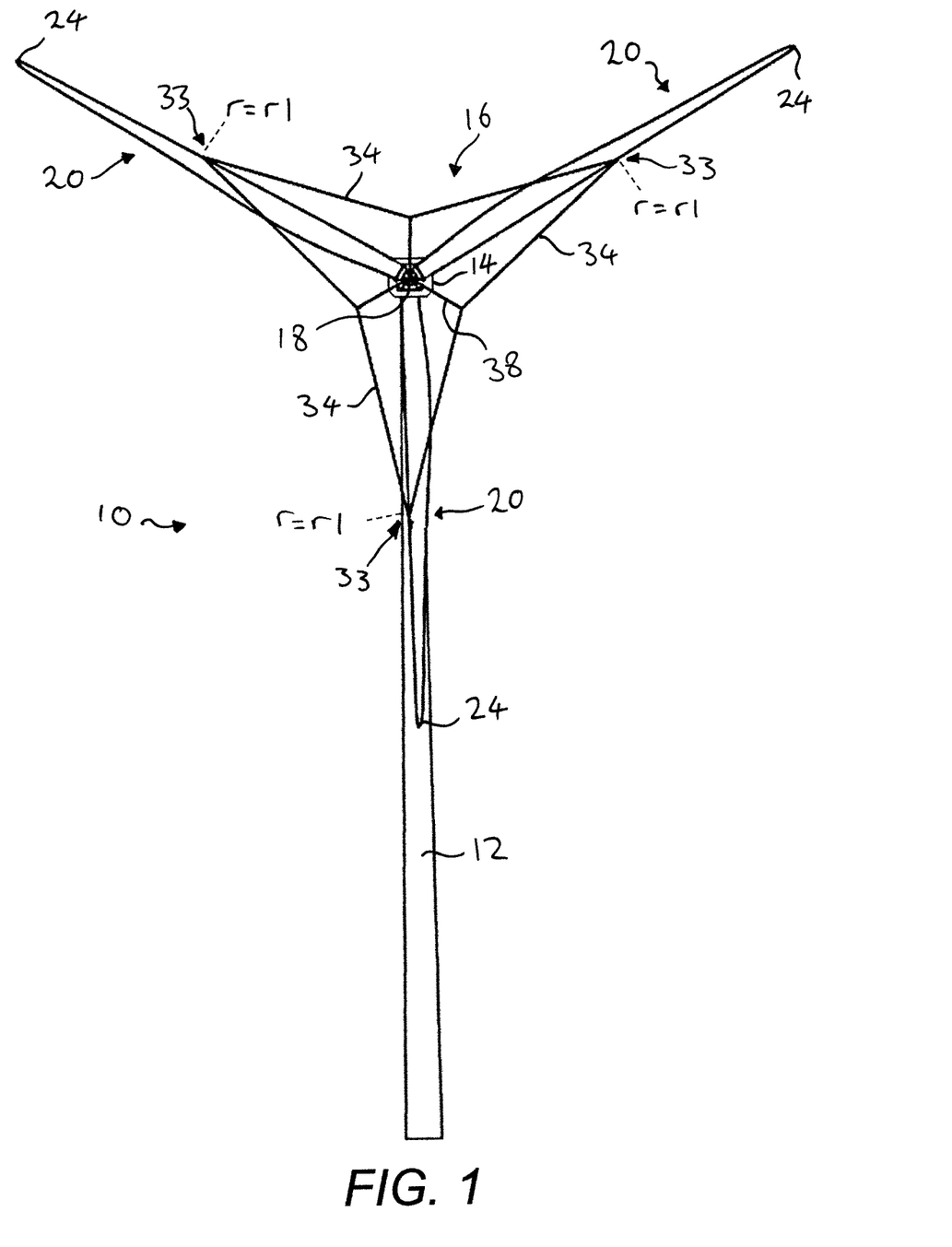
FIG. 1 is a schematic view of a wind turbine comprising a rotor having a plurality of wind turbine blades and blade connecting members.

FIG. 1 shows a wind turbine 10 comprising a tower 12 and a nacelle 14 mounted on the tower 12. A rotor 16 is mounted to the nacelle 14, and the rotor 16 comprises a hub 18 and a plurality of pitchable wind turbine blades 20. In this example, the wind turbine 10 comprises three pitchable blades 20. The wind turbine blades 20 are connected to the hub 18 via respective pitch mechanisms (not shown), by means of which the blades 20 are rotatable relative to the hub 18. As such, the pitch of the wind turbine blades 20 can be controlled in dependence on the relative velocity of the incident wind to ensure that the blades 20 are oriented with an advantageous angle of attack for capturing energy from the wind.

Figure 2:
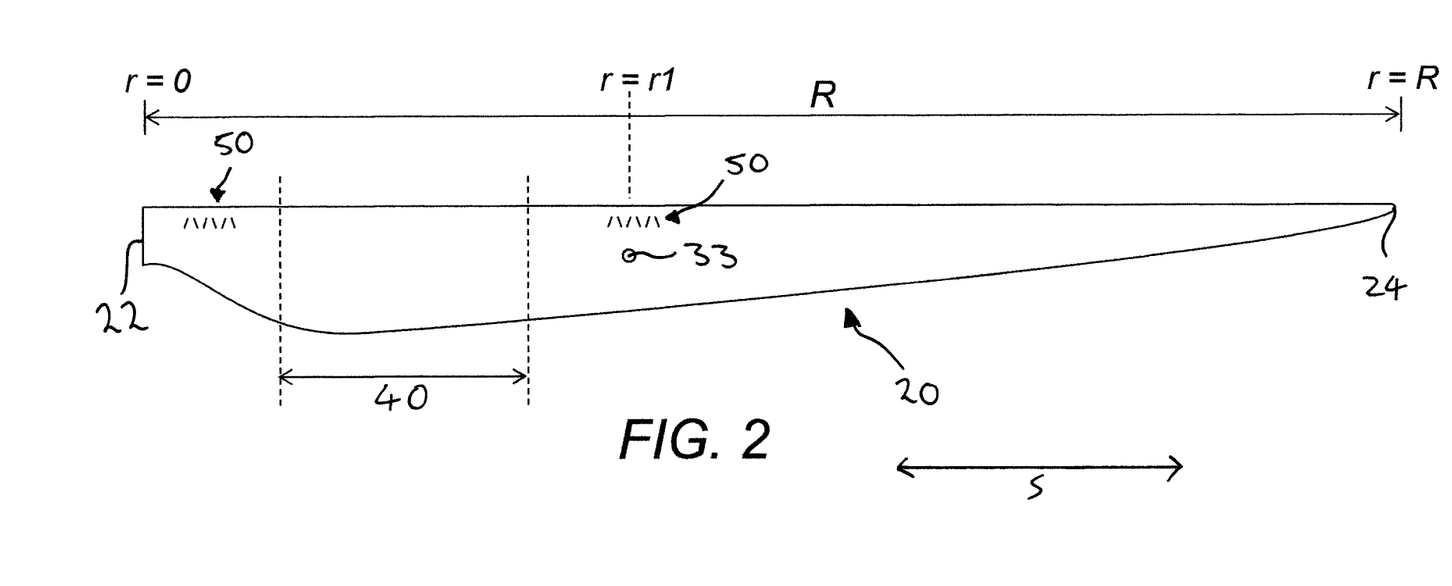
FIG. 2 is a plan view of a wind turbine blade comprising a connection point for connecting a blade connecting member to the blade.

Referring additionally to FIG. 2, each blade 20 extends from a blade root 22 to a blade tip 24 in a spanwise direction(S). The blade 20 is defined non-dimensionally herein as having a total blade length R. As such, the blade root 22 defines a radial position r=0, and the blade tip 24 defines a radial position r=R. In some examples, the total blade length R may be at least 70 m.

Figure 3:
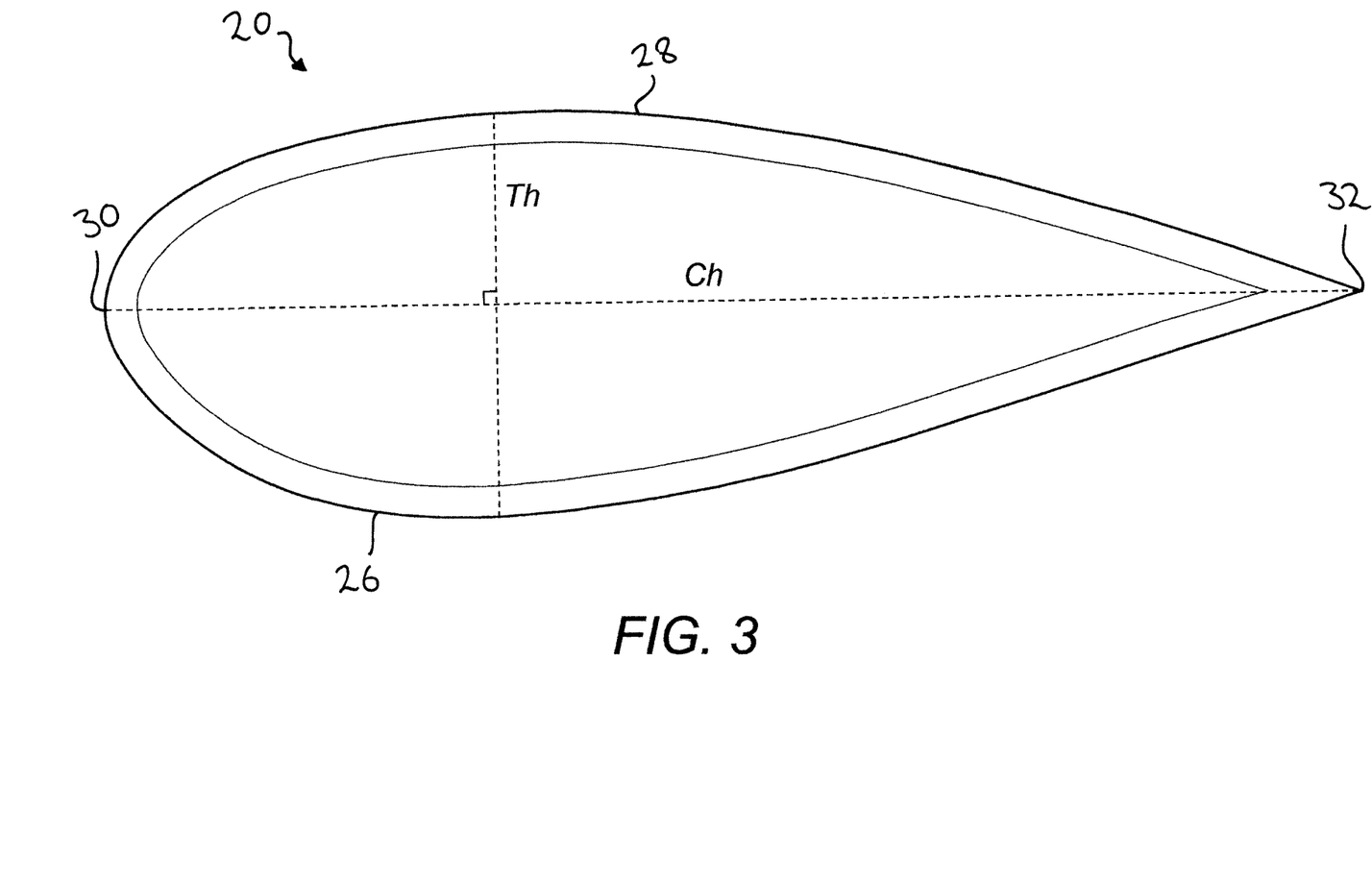
FIG. 3 is a cross sectional view of an airfoil portion of the wind turbine blade.

With reference now to FIG. 3, which shows a schematic cross-sectional view of a blade 20, each blade 20 comprises a windward side 26 and a leeward side 28 which meet at a leading edge 30 and a trailing edge 32 of the blade 20 to define an airfoil profile. The airfoil profile generates a lift force when wind is incident on the blade 20, and the lift force motivates the rotor 16 to rotate and drive a generator (not shown) to produce electrical power. The blade 20 comprises a chord (Ch) which is the distance between the leading edge 30 and the trailing edge 32. Further, the blade 20 comprises a thickness (Th) which is the greatest distance between the windward and leeward sides 26, 28 orthogonal to the chord (Ch). The relative thickness of the blade 20 is the ratio of thickness (Th) to chord (Ch) at a given radial position r along the length R of the blade 20.

As noted previously by way of background, thicker portions of the blade 20, or portions having a high relative thickness, typically have a relatively low glide ratio (which is the ratio of lift coefficient to drag coefficient) at the operational angles of attack when wind is incident on the blade 20. As such, on existing wind turbine blades, the thick airfoil profiles near the blade root which are required to support the loads experienced by the blade in use, are more sensitive to surface roughness and typically do not add much to the power produced by the wind turbine. In fact, such thicker portions may cause drag which is detrimental to the aerodynamic performance of the blade.

However, the wind turbine 10 of the present invention advantageously facilitates the use of aerodynamically improved wind turbine blades 20 that can capture more energy from the wind to thereby improve the energy production capability of the wind turbine 10.

With reference again to FIGS. 1 and 2, the blades 20 of the wind turbine 10 comprise a connection point 33 located at a first radial position (r1) between the blade root 22 and the blade tip 24. The wind turbine 10 further comprises one or more blade connecting members 34 connected between the connection point 33 and a corresponding connection point on a neighbouring blade 20. The blade connecting members 34 may be blade connecting cables 34. As such, the rotor 16 mounted to the nacelle 14 may therefore be referred to as a cable stayed rotor 16. The blade connecting member 34 may be connected to the blade 20 at the connection point 33 at radial position r1 via a rotatable coupling (not shown) such that the blade 20 can be pitched, i.e. rotated, relative to the hub 18 whilst connected to the blade connecting member 34. The blade connecting member 34 of the wind turbine blades 20 may be arranged adjacent each other, such as next to each other or even sharing some structural elements of the connection point 33. For example, two blade connecting members 34 (connected to different blades 20 at their opposite ends) may be connected to the same connection point 33 of one blade 20. This has the advantage that when tension is applied in the blade connecting members 34, then the blade 20 is affected by one combined force and hence the blade 20 will not be exposed to tension in two different directions by the blade connecting members 34. Furthermore, when the connection points 33 are adjacent to each other or the same connection point 33 is used for both blade connecting members 34, it is possible to arrange the connection point(s) 33 of both blade connecting members 34 closer to or even on the blade pitch axis.

Each blade connecting member 34 takes up a proportion of the load experienced by the blade 20 in use, and provides an additional load path via which to transfer loads to the hub 18 and/or between the blades 20. The blade connecting members 34 connected between neighbouring blades 20 means that the blades 20 partly 'carry' each other so that some of the loads may be transferred between the blades 20 by a connecting member 34. Further, the blade connecting members 34 facilitate a transfer, or unloading of some of the load to the hub 18. The blade connecting member 34 provides a load path which bypasses the blade root 22 and a portion of the blade 20 between the blade root 22 and the connection point 33 at r1.

Figure 9:
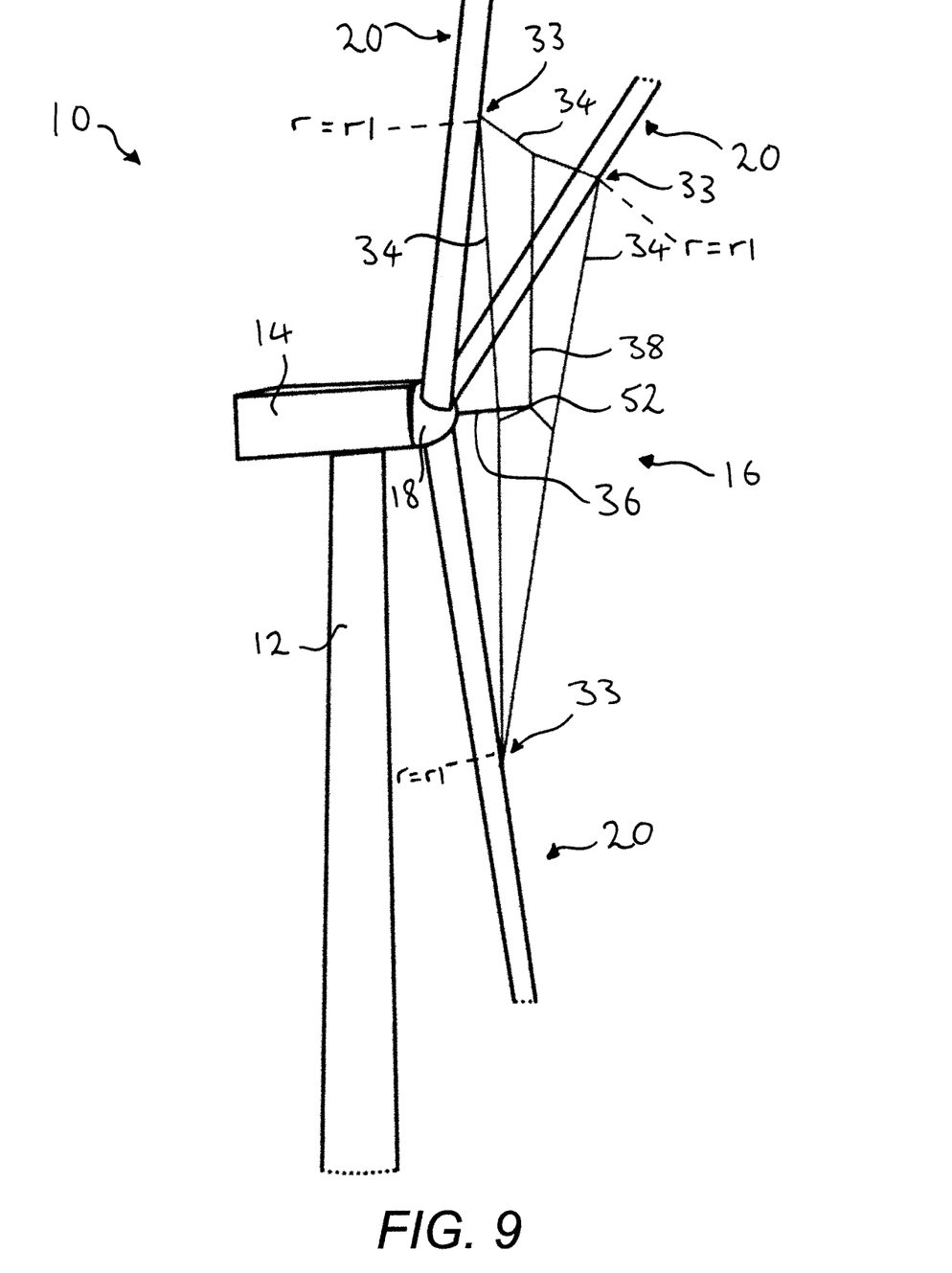
FIG. 9 is a schematic view of a wind turbine comprising a rotor having a pre-tension member connected between a blade connecting member and a hub part.

In preferred examples, the connection point 33 may be located in a radial interval of the blade 20 between r=0.35R and r=0.50R. Providing the connection point 33 in this radial interval may advantageously enable the blade connecting member 34 to take up a significant proportion of the loads experienced by the blade 20 in use. In some examples, the wind turbine 10 may additionally comprise a pre-tension member 38, such as a pre-tension cable 38, which may be adjustable to increase or decrease the tension in the blade connecting member 34 to thereby control how much load is transferred from the blade 20 into the blade connecting member 34. The pre-tension member 38 may be connected at one end to one or more blade connecting members 34, and at the other end to the hub 18 as shown in FIG. 1, or to a hub part 36 as shown in FIG. 9.

Figure 4:
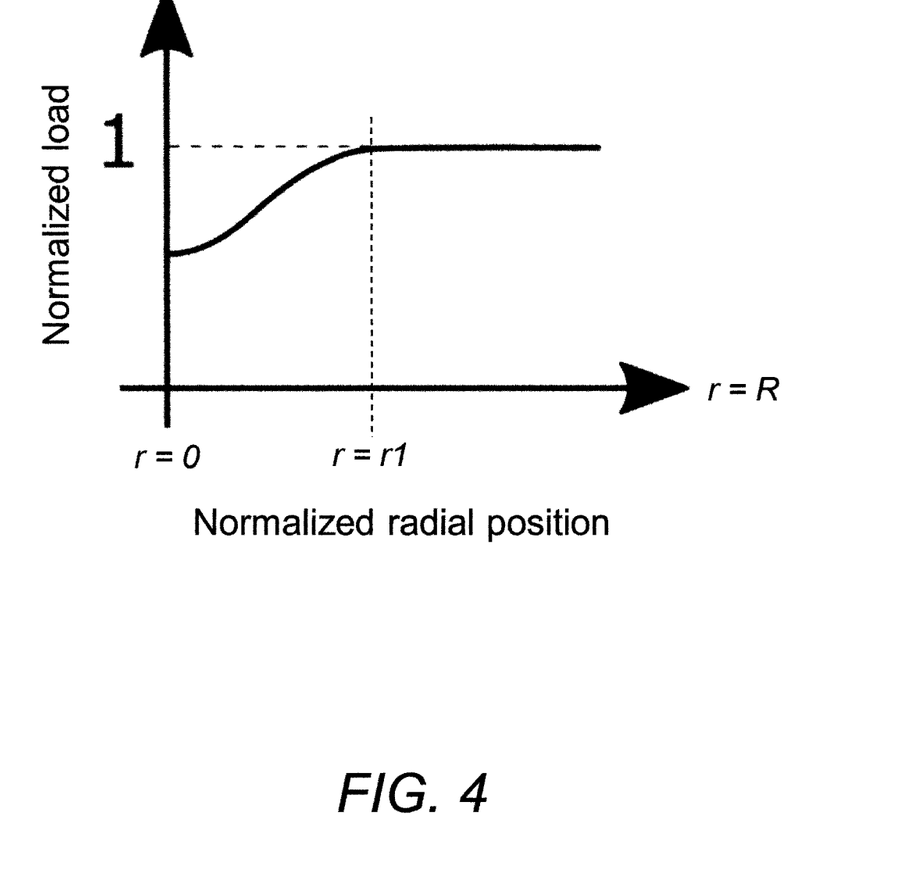
FIG. 4 shows a schematic load distribution of a blade of the invention compared to a typical prior art blade.

Referring briefly to FIG. 4, the load distribution shown schematically in FIG. 4 shows how the loads on the blade 20, e.g. flap-wise and edge-wise loads, decrease inboard of the connection point 33 at r1 because a proportion of the load is transferred to the blade connecting member 34 compared to a blade 20 without blade connecting members 34. The provision of a blade connecting member 34 connected to the blade 20 at the connection point 33 therefore reduces the loads experienced by the blade 20 inboard of the connection point 33. Accordingly, the structural requirements of the blade 20 inboard of the connection point 33 are lower as compared to prior art blades, and the aerodynamic performance of the blade 20 may therefore be improved as the blade design balanced between structural performance vs. aerodynamical performance safely may be allowed to shift more towards aerodynamic performance.

In particular, and with reference again to FIG. 2, the wind turbine blade 20 comprises an inboard portion 40 between the blade root 22 and the connection point 33 in which the blade 20 is configured for improved aerodynamic performance. For example, the inboard portion 40 may extend in a radial interval of between r=0.2R and r=0.55R. In some examples, the inboard portion 40 may extend over a length of at least 0.05R, but preferably not greater than a length of 0.3R.

Figure 5:
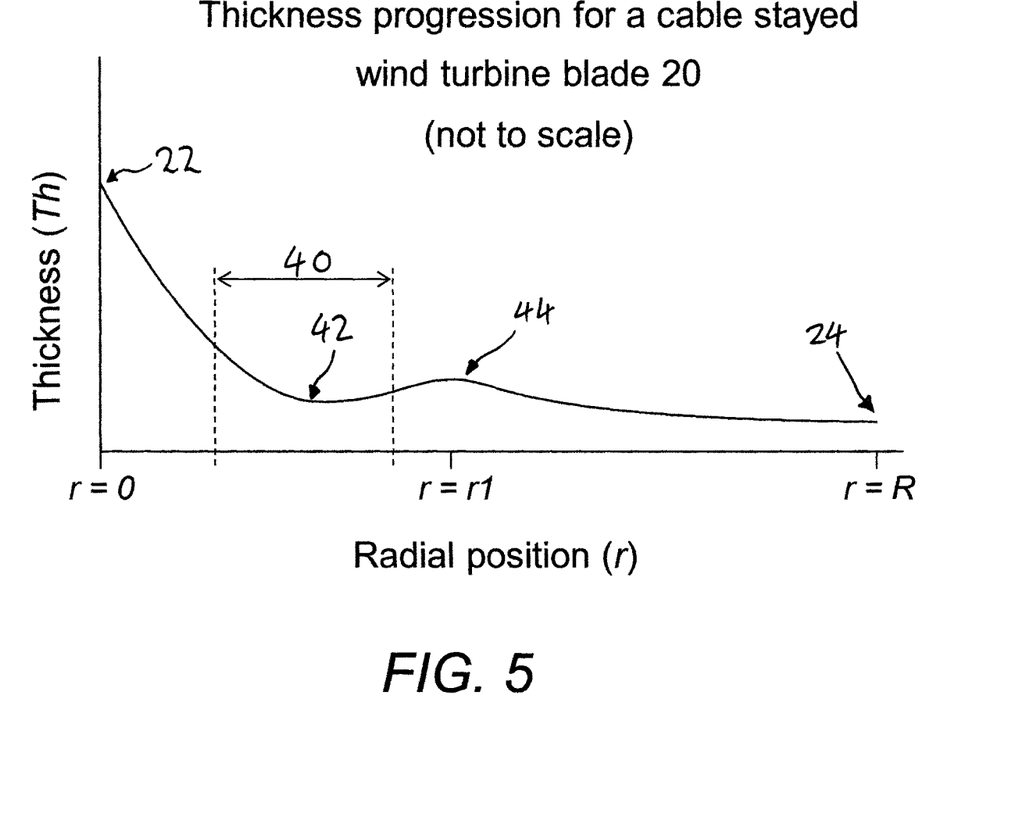
FIG. 5 is a schematic representation of a thickness progression of a blade comprising a local minimum thickness within an inboard portion.

The inboard portion 40 of the wind turbine blade 20 will now be described with reference to FIGS. 5 to 8. Referring initially to FIG. 5, but with continued reference also to the preceding figures, the thickness (Th) of the blade 20 may have a local minimum 42 within the inboard portion 40. That is to say, the thickness (Th) of the blade 20 may decrease within the inboard portion 40 to an inflection point at the local minimum 42 whereafter the thickness (Th) increases. For example, the thickness (Th) of the blade 20 may decrease from the blade root 22 moving outboard to the local minimum 42, and increase moving outboard from the local minimum 42 towards the connection point 33. Reducing the thickness (Th) of the blade 20 to a local minimum 42 within the inboard portion 40 provides improved aerodynamic performance over typical blades which have thicker airfoils in a comparable portion of the blade.

Preferably, the local minimum 42 is located in a radial interval of between 0.05R and 0.1R inboard from the connection point 33 at r1. As such, the local minimum 42 is preferably spaced away from the connection point 33 and the thickness (Th) of the blade 20 is not compromised in the vicinity of the connection point 33 to ensure that the blade 20 is sufficiently strong at the connection point 33. It is preferable for the inboard portion 40 to be as close as possible to the connection point 33, i.e. as far outboard as possible, to increase the advantage of the aerodynamic inboard portion 40 and thereby increase power production of the wind turbine 10, whilst still being spaced at least 0.02R, preferably at least 0.05R inboard from the connection point 33 such that the blade 20 is sufficiently strong at and near to the connection point 33.

Figure 6:
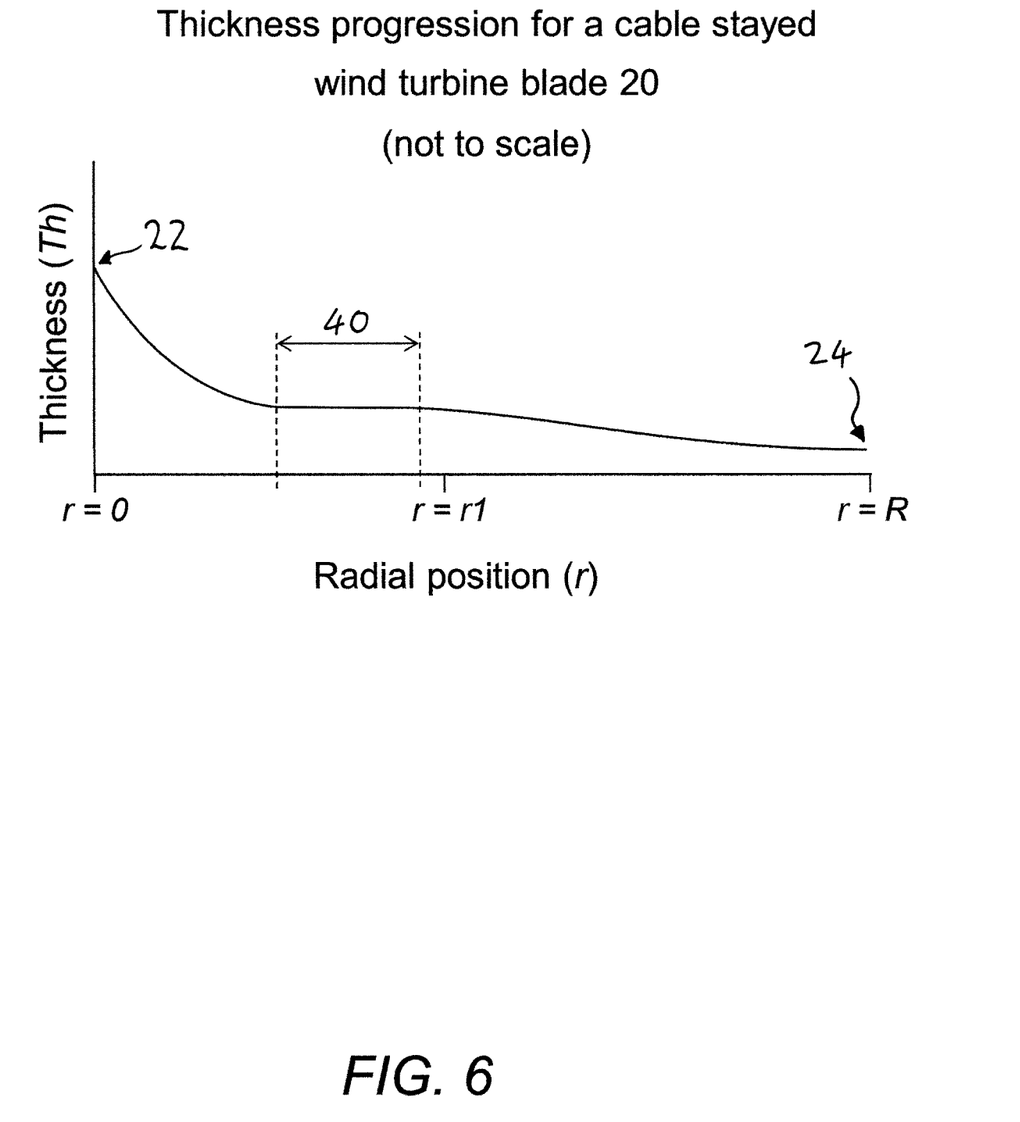
FIG. 6 is a schematic representation of a thickness progression of a blade comprising a substantially constant thickness within the inboard portion.

As shown in FIG. 6, in some examples the thickness (Th) of the blade 20 may be substantially constant in the inboard portion 40. Such a configuration may facilitate simpler and/or more cost-effective manufacture of the wind turbine blade 20. Further, compared to a typical wind turbine blade that does not include an inboard portion 40 having a substantially constant thickness (Th), the wind turbine blade 20 advantageously uses less material to manufacture, and may comprise thinner airfoil profiles closer to the blade root 22 at radial position r=0. As such, the constant thickness (Th) in the inboard portion 40 results in a blade 20 that has improved aerodynamic performance.

As shown in FIGS. 5 and 6, the thickness (Th) of the blade 20 preferably decreases moving from the blade root 22 to the inboard portion 40. As such, the blade root 22 at radial position r=0 preferably has the highest thickness (Th). In preferred examples the thickness (Th) of the blade 20 decreases strictly monotonically moving from the blade root 22 to the inboard portion 40. In such a configuration the blade profiles transition quickly from structural profiles at or near the blade root 22, to more aerodynamically beneficial profiles near to, and in, the inboard portion 40.

Moving outboard from the inboard portion 40 towards the connection point 33 at r1, in some examples the thickness (Th) of the blade 20 may increase. For example, FIG. 5 shows how the thickness (Th) of the wind turbine blade 20 may have a local maximum 44 in the vicinity of the connection point 33. The thickness (Th) of the wind turbine blade 20 may therefore increase at or near to the connection point 33 to provide a thicker, stronger portion of the blade 20 at the location at which the blade connecting member 34 is connected. Whilst not shown in FIG. 6, it will be appreciated that a wind turbine blade 20 having a substantially constant thickness (Th) in the inboard portion 40 may also comprise a local maximum of thickness (Th) as described above.

Referring still to FIGS. 5 and 6, in some examples, the thickness (Th) of the blade 20 may decrease strictly monotonically moving from the connection point 33 to the blade tip 24. Accordingly, the airfoil profiles of the blade 20, moving from the connection point 33 at r1 to the tip 24, may be configured for improved aerodynamic performance to capture energy from the incident wind. In particular, outboard from the connection point 33 the blade 20 may have reduced structural/load-bearing requirements, such that relatively thin airfoil profiles with advantageous aerodynamic characteristics may be used outboard of the connection point 33.

Figure 7:
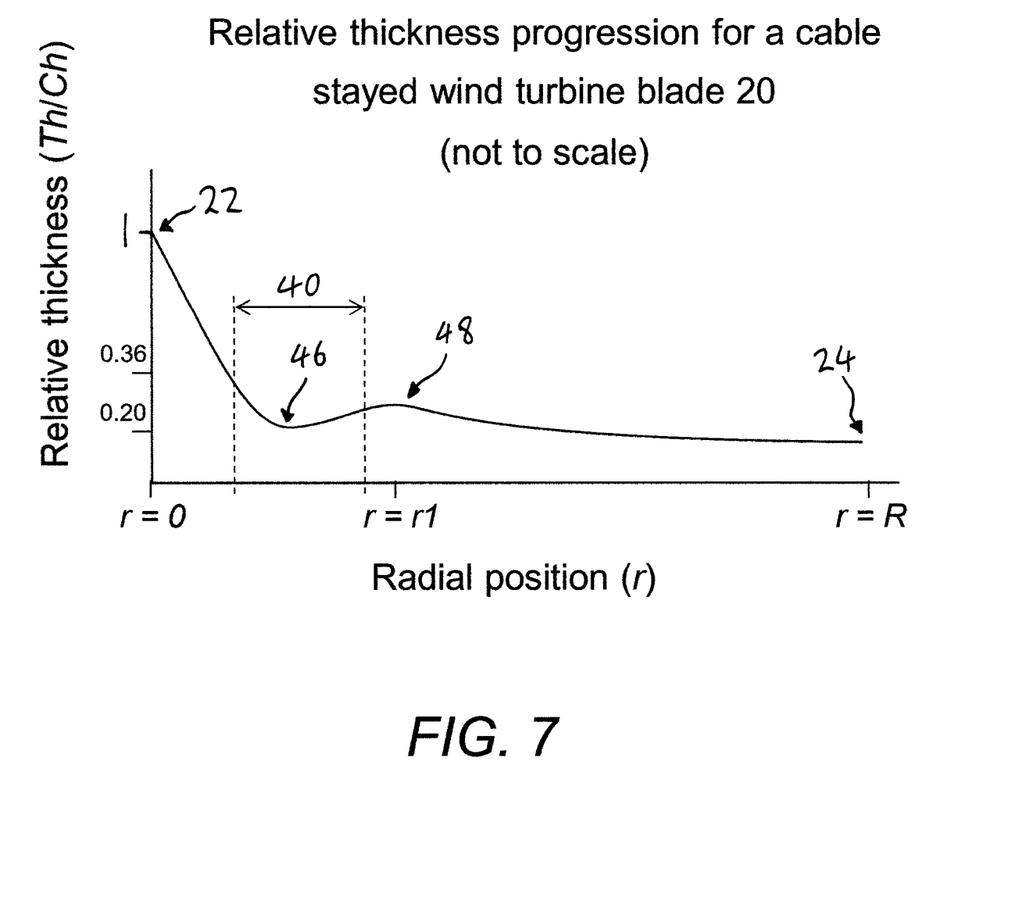
FIG. 7 is a schematic representation of a relative thickness progression of a blade comprising a local minimum relative thickness within an inboard portion.

With reference now to FIG. 7, in some examples the relative thickness of the blade 20, i.e. the ratio of thickness (Th) to chord (Ch), may have a local minimum 46 within the inboard portion 40. As previously described, decreasing the relative thickness provides a more advantageous airfoil profile that can capture more energy from the wind to help increase the total power produced by the wind turbine 10. The local minimum relative thickness 46 provides an aerodynamically advantageous blade profile in the inboard portion 40 compared to typical blades which required thick, and aerodynamically detrimental, profiles in such an inboard region to resist bending loads.

Figure 8:
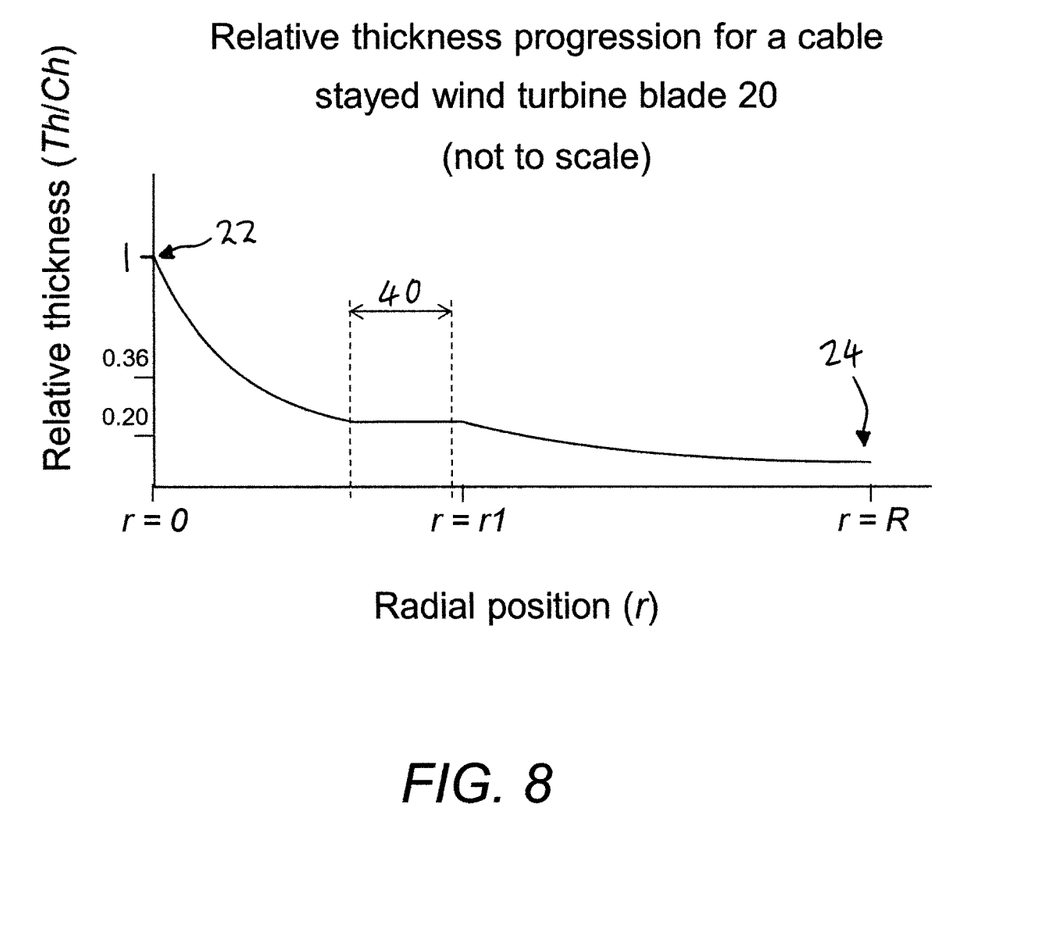
FIG. 8 is a schematic representation of a relative thickness progression of a blade comprising a substantially constant relative thickness within the inboard portion.

As shown in FIG. 8, in some examples the relative thickness of the blade 20 may be substantially constant in the inboard portion 40. A substantially constant relative thickness may result from a substantially constant thickness (Th) and a substantially constant chord (Ch) in the inboard portion 40. Alternatively, a substantially constant relative thickness may result from the thickness (Th) and chord (Ch) of the blade 20 increasing or decreasing at substantially the same rate.

Manufacture of a blade 20 comprising a substantially constant relative thickness in the inboard portion 40 may be simplified in comparison to manufacture of a typical wind turbine blade. Further, compared to a typical wind turbine blade that does not include an inboard portion 40 having a substantially constant relative thickness, the wind turbine blade 20 may comprise airfoil profiles with an aerodynamically advantageous relative thickness closer to the blade root 22, i.e. over more of the total length R of the blade 20. As such, the constant relative thickness in the inboard portion 40 results in a blade 20 that has improved aerodynamic performance.

As shown in FIGS. 7 and 8, the relative thickness of the blade 20 may be between 0.2 and 0.36 throughout the inboard portion 40 in the most preferred examples. In comparison to existing blades, a blade 20 with a reduced relative thickness throughout the inboard portion 40 as shown in FIGS. 7 and 8 may generate more lift from the incident wind and thereby generate more power.

Further, as shown in FIGS. 7 and 8, the relative thickness of the blade 20 preferably decreases moving from the blade root 22 to the inboard portion 40. As such, the blade root 22 at radial position r=0 preferably has the highest relative thickness. For example the blade 20 may have a relative thickness of 1 at the blade root 22 in examples where the blade root 22 comprises a circular profile. In preferred examples, the relative thickness of the blade 20 may decrease strictly monotonically moving from the blade root 22 to the inboard portion 40. As such, the blade 20 may become more aerodynamically optimised moving from the blade root 22 to the inboard portion 40.

Outboard of the inboard portion 40, i.e. moving from the inboard portion 40 to the connection point 33, the relative thickness of the blade 20 may increase, as shown in FIG. 7. For example, the relative thickness of the blade 20 may have a local maximum 48 in the vicinity of the connection point 33. In some examples the relative thickness may be increased due to an increased thickness (Th) at or near to the connection point 33 to provide a stronger portion of the blade 20 at the location at which the blade connecting member 34 is attached, as previously described. In some examples, the relative thickness of the blade 20 may be between 0.15 and 0.5 at the connection point 33. A relative thickness in this range may provide an advantageous compromise between blade strength and aerodynamic performance at the connection point 33. Whilst not shown in FIG. 8, it will be appreciated that a wind turbine blade 20 having a substantially constant relative thickness in the inboard portion 40 may also comprise a local maximum relative thickness 48 as described above.

As shown in the relative thickness progressions in FIGS. 7 and 8, in some examples, the relative thickness of the blade 20 may decrease strictly monotonically moving from the connection point 33 at r1 to the blade tip 24. As such, outboard of the connection point 33, the blade 20 may be configured with airfoil profiles that offer improved aerodynamic performance by generating more lift.

The relative thickness of the blade 20 is preferably less than 0.36 for a length of at least 0.05R. between the blade root 22 and the connection point 33. As such, the provision of an additional load path in the form of the blade connecting member 34 advantageously facilitates the use of a substantially thin wind turbine blade 20 that is configured for improved aerodynamic performance. In particular, the rotor 16 comprising the blade connecting members 34 enables the use of wind turbine blades 20 with airfoil profiles designed primarily for aerodynamic performance instead of structural performance over a greater length or proportion of the blade 20.

It will be appreciated that the thickness progression shown by way of example in FIG. 5 may describe the same blade 20 as the relative thickness progressions in FIG. 6 or 7 in some examples. Similarly, it will be appreciated that the thickness progression shown by way of example in FIG. 6 may describe the same blade 20 as the relative thickness progressions in FIG. 7 or 8 in some examples. Detailed description of each different configuration is not provided for conciseness, but it will be appreciated that the respective description provided above in relation to each of the thickness and relative thickness progressions is equally applicable in examples comprising the above-noted combinations.

In order to further improve the aerodynamic performance of the blade 20, in some examples the blade 20 may comprise one or more aero devices 50 arranged between the blade root 22 and the inboard portion 40, as shown schematically in FIG. 2. Aero devices 50 may help to compensate for the reduced aerodynamic performance in the portion of the blade 20 having a higher thickness (Th) and/or relative thickness near the blade root 22. By way of example, such aero devices 50 may include one or more of a vortex generator, gurney flap or stall barrier. In some examples, the blade 20 may additionally or alternatively comprise aero devices 50 in the vicinity of the connection point 33 to manipulate the airflow over the blade 20 near the connection point 33 such that the drag effect or turbulence caused by the connection point 33 is minimised.

It will be appreciated that the above description and accompanying figures are provided merely as an example of the present invention. Many alternatives to the specific examples described above are therefore possible without departing from the scope of the invention as defined in the appended claims.

For example, the wind turbine 10 shown by way of example in FIG. 1 comprises a blade connecting member 34 connected between the connection point 33 of a blade 20 and a corresponding connection point 33 on a neighbouring blade 20, and may comprise a pre-tension member 38 connected between the blade connecting member 34 and the hub 18. However, as shown in FIG. 9, in some examples the wind turbine 10 may additionally or alternatively comprise a pre-tension member 38 connected between one or more blade connecting members 34 and a connection point 52 on a hub part 36 connected to the hub 18. For example, the hub part 36 may extend from the hub 18 in an upwind direction. As such, connecting the pre-tension member 38 to a hub part 36 such as that shown in FIG. 9 may cause the tension in the blade connecting member 34 and pre-tension member 38 to pull the blade 20 upwind and away from the tower 12, thereby increasing clearance to the tower 12 and reducing the risk of long blades 20 striking the tower 12 in high wind conditions.

Further, whilst not shown in the accompanying figures, the thickness (Th) and/or chord (Ch) of the blade 20 may be substantially constant at or near the connection point 33. Such a configuration may facilitate a simpler manufacturing process for the blade 20. Additionally, such a configuration may facilitate the provision of the blade 20 as a modular blade comprising two or more blade modules (not shown). Such a configuration may enable manufacture of blades with an adjustable length by a replacement of a minor blade module only The blade modules may be connected at a joint in a portion of the blade 20 having a substantially constant thickness (Th) and/or chord (Ch) which facilitates manufacture of the blade modules and alignment of the modules when assembling the blade 20. The connection point 33 for connecting the blade connecting member 34 to the blade 20 may be provided at the joint in some preferred examples. Advantageously, a modular blade 20 may be reinforced at the joint between the blade modules, and connecting the blade connecting member 34 at the joint may therefore ensure that the blade connecting member 34 is connected to a strong portion of the blade 20.

It will be appreciated that in all of the examples described herein, the blade connecting member 34 provides a supplementary load path for a proportion of the blade loads to bypass the inboard portion 40 and the blade root 22. As such, all of the configurations described herein facilitate the provision of a wind turbine blade 20 having a thickness (Th) and/or relative thickness that is substantially constant or has a local minimum 42, 46 within the inboard portion 40 because the inboard portion 40 of the blade 20 is required to take up and transfer less load. The use of a pitchable rotor 16 comprising blade connecting members 34 therefore facilitates the use of more aerodynamically optimized wind turbine blades 20 which help to increase the annual energy production (AEP) of the wind turbine 10.

Further, a pitchable rotor 16 such as those described herein comprising blade connecting members 34 may comprise blades 20 that are up to 20% lighter in weight compared to typical blades of a comparable size. It follows that a rotor 16 comprising blade connecting members 34 and having the same weight as a standard rotor may comprise longer blades 20. As such, in some examples a rotor 16 as described herein may be mounted to an existing turbine 10 to upgrade the potential power production of the turbine 10 without increasing the load on the main bearing and/or without increasing blade root and hub dimensions.

The description provided herein serves to demonstrate a plurality of possible examples of the present invention. Features described in relation to any of the examples above may be readily combined with any other features described with reference to different examples without departing from the scope of the invention as defined in the appended claims.

The invention claimed is:

1. A wind turbine comprising a tower, a nacelle mounted on the tower, and a rotor mounted to the nacelle,
   the rotor comprising a hub and at least three pitchable wind turbine blades connected to the hub via respective pitch mechanisms,
   each blade extending from a blade root defining a radial position $r=0$ to a blade tip defining a radial position $r=R$;
   each blade comprising a windward side and a leeward side which meet at a leading edge and a trailing edge to define an airfoil profile, a chord being a distance between the leading and trailing edges, and a relative thickness being a ratio of thickness to chord, the airfoil profile having a thickness being the greatest distance between the windward and leeward sides orthogonal to the chord;
   each blade comprising a connection point located at a first radial position ($r1$) between the blade root and the blade tip, wherein the connection point is located at a part of the blade that is pitchable, and the wind turbine further comprising one or more blade connecting members connected between the connection point and a corresponding connection point on a neighbouring blade,
   wherein the thickness and/or the relative thickness of each blade is substantially constant or has a local minimum within an inboard portion of the blade between the blade root and the connection point.

2. The wind turbine of claim 1, wherein the inboard portion extends in a radial interval of between $r=0.2R$ and $r=0.55R$.

3. The wind turbine of claim 1, wherein throughout the inboard portion of each blade the relative thickness is between 0.15 and 0.50.

4. The wind turbine of claim 1, wherein the thickness and/or the relative thickness of each blade decreases moving from the blade root to the inboard portion.

5. The wind turbine of claim 4, wherein the thickness and/or the relative thickness of each blade decreases strictly monotonically moving from the blade root to the inboard portion.

6. The wind turbine of claim 1, wherein the thickness and/or the relative thickness of each blade increases moving from the inboard portion to the connection point.

7. The wind turbine of claim 1, wherein the local minimum is located in a radial interval of between 0.02R and 0.25R, inboard from the connection point.

8. The wind turbine of claim 1, wherein the connection point of each blade is located in a radial interval between $r=0.20R$ and $r=0.6R$.

9. The wind turbine of claim 1, wherein the relative thickness of each blade at the connection point is between 0.15 and 0.5.

10. The wind turbine blade of claim 1, wherein the thickness and/or the relative thickness of the blade has a local maximum at the the connection point.

11. The wind turbine of claim 1, wherein the thickness and/or chord and/or the twist of the blade is substantially constant at or near the connection point ($r1$).

12. The wind turbine of claim 1, wherein the thickness and/or the relative thickness of each blade decreases strictly monotonically moving from the connection point to the blade tip.

13. The wind turbine of claim 1, wherein the relative thickness of each blade is less than 0.5, for a length of at least 0.05R between the blade root and the connection point.

14. The wind turbine of claim 1, further comprising one or more aero devices arranged between the blade root and the inboard portion and/or at the connection point.

15. The wind turbine of claim 1, wherein each blade has a total blade length R of at least 70 m.

16. A plurality of wind turbine blades, comprising:
    at least three wind turbine blades, wherein each blade:
    extends from a blade root defining a radial position $r=0$ to a blade tip defining a radial position $r=R$;
    defines a windward side and a leeward side which meet at a leading edge and a trailing edge to define an airfoil profile, a chord being a distance between the leading and trailing edges, and a relative thickness being a ratio of thickness to chord, the airfoil profile having a thickness being the greatest distance between the windward and leeward sides orthogonal to the chord;

defines a connection point located at a first radial position (r1) between the blade root and the blade tip, wherein the connection point is located at a part of the blade that is pitchable; and one or more blade connecting members connected between corresponding connection points on neighbouring blades, wherein the thickness and/or the relative thickness of each blade is substantially constant or has a local minimum within an inboard portion of the blade between the blade root and the connection point.

17. The plurality of wind turbine blades of claim 16, wherein the thickness and/or the relative thickness of each blade decreases moving from the blade root to the inboard portion.

18. The plurality of wind turbine blades of claim 16, wherein the thickness and/or the relative thickness of each blade decreases strictly monotonically moving from the blade root to the inboard portion.

19. The wind turbine of claim 1, further comprising:
an adjustable pre-tension cable connected at a first end to a blade connecting member of the one or more blade connecting members and at a second end to the hub, and wherein the adjustable pre-tension cable is adjustable to increase or decrease tension in the blade connecting member.

20. The wind turbine of claim 1, wherein the connection point of each blade is located in a radial interval between r=0.3R and r=0.55R.

* * * * *